United States Patent [19]

Mouterde et al.

[11] Patent Number: 5,347,908
[45] Date of Patent: Sep. 20, 1994

[54] AMMUNITION MAGAZINE

[75] Inventors: Renaud Mouterde, Versailles; Michel Bouzianne, Bose D'Arcy, both of France

[73] Assignee: Giat Industries, Versailles Cedex, France

[21] Appl. No.: 961,628

[22] Filed: Oct. 16, 1992

[30] Foreign Application Priority Data

Oct. 17, 1991 [FR] France .................... 91 12796

[51] Int. Cl.$^5$ ............................................. F41A 9/76
[52] U.S. Cl. .......................................... 89/34; 89/45
[58] Field of Search ............... 89/33, 16, 34, 45, 46, 89/35.01

[56] References Cited

U.S. PATENT DOCUMENTS

| | | | |
|---|---|---|---|
| 4,318,331 | 3/1982 | Echtler et al. | 89/34 |
| 4,860,633 | 8/1989 | Wiethoff et al. | 89/45 |
| 4,885,976 | 12/1989 | Nordmann | 89/35.01 |
| 4,919,038 | 4/1990 | Kaustrater et al. | 89/46 |
| 4,951,547 | 8/1990 | Novet et al. | 89/34 |

FOREIGN PATENT DOCUMENTS

| | | |
|---|---|---|
| 0301259 | 2/1989 | European Pat. Off. |
| 0337735 | 10/1989 | European Pat. Off. |
| 0361050 | 4/1990 | European Pat. Off. |
| 2433568 | 1/1975 | Fed. Rep. of Germany |

*Primary Examiner*—Stephen C. Bentley
*Attorney, Agent, or Firm*—Oliff & Berridge

[57] ABSTRACT

A ammunition magazine of the disclosure includes a conveyor where ammunition are stored vertically and brought to an outlet of the magazine, and a device for automatically withdrawing each ammunition from the magazine. The conveyor includes a plurality of vertical tubes placed side by side to form a closed chain, attachment devices linking two adjacent tubes, and a device for driving the chain inside the magazine along a closed-loop rolling track.

A magazine of this type can, in particular, be installed in a tank and be situated low down and at the rear thereof.

31 Claims, 3 Drawing Sheets

AMMUNITION MAGAZINE

BACKGROUND OF THE INVENTION

This invention concerns an ammunition magazine, especially for a tank.

In general, the ammunition stored in a tank is taken from a magazine and loaded manually into the gun barrel. This magazine, where the ammunition is stored horizontally, is situated in the tank turret, that is, high up and in an area not too far from the gun, in order to facilitate loading operations. In other words, the magazine is in a storage area provided in the turret, this area being divided into compartments in order to receive the ammunition introduced from outside the turret.

It has been recognized, however, that the turret of a tank is a vulnerable area, poorly protected from enemy projectiles. It has also been recognized that the least exposed area is located low down and at the rear of the tank. However, although selection of such a location for the ammunition magazine offers conditions of maximum safety for the crew, it presents the problem of delivering ammunition to the gun barrel.

SUMMARY OF THE INVENTION

The purpose of the invention is to design an ammunition magazine of a totally different type, with a view to being associated with a system for automatically loading ammunition into the gun of a tank from a magazine that can, in particular, be situated low down and at the rear of the tank.

To achieve this purpose, the invention proposes an ammunition magazine characterized by comprising a conveyor providing vertical storage of the ammunition so as to bring the ammunition automatically in front of an outlet of the magazine, and a device for withdrawing each ammunition from the magazine.

According to one embodiment of the invention, the conveyor comprises a plurality of vertical tubes placed side by side forming a closed chain, attachment devices linking two adjacent tubes of the conveyor, and a device for driving the chain of tubes inside the magazine along a closed-loop rolling track.

In general, each attachment device between two adjacent tubes of the conveyor is such that one of the tubes is advantageously movable by circular displacement with respect to the axis of at least one of the two adjacent tubes.

Thus, with this type of articulated attachment between two adjacent tubes, it is possible for the chain formed by the set of tubes of the conveyor to move along a closed-loop rolling track having rectilinear and curved portions. One particular advantage of such an arrangement is that it is possible to define a rolling track of greater length than a simple circular rolling track in which two adjacent tubes would be attached in a fixed manner to one another. The result is that a greater amount of ammunition can be stored in the magazine.

According to the aforesaid embodiment, each attachment device comprises two circular rings with parallel axes, integral with a support plate and situated respectively on either side thereof, one of the rings being mounted in a fixed manner around a tube, while the other ring is mounted with a clearance around one of the adjacent tubes.

Again according to this embodiment, the device for driving the chain of tubes of the conveyor comprises a motor apparatus; at least one belt wound between two rollers with vertical axes, one of which is rotated by the motor apparatus, the belt extending parallel to the chain of tubes of the conveyor along a rectilinear portion thereof; and positive drive arrangement between the belt and the chain of tubes, for example in the form of holes in the belt and lateral pins situated at the attachment devices between the tubes, the orifices and pins being spaced at the same pitch.

During displacement of the chain, the tubes of the conveyor are guided along the roller track in a closed loop defined by annular guide channels or grooves provided on the inside faces of the upper and lower plates of the frame of the magazine, and in which engage, for example, rollers and/or balls present on the attachment devices of the conveyor tubes.

In general, the entrance to the magazine is defined by an opening provided in the upper plate of the magazine, the opening being in line with the chain of conveyor tubes, so that the ammunition can be introduced into the various tubes of the conveyor; and the outlet of the magazine is defined by an opening situated on one of the sides of the magazine, with a height and width greater than those of the ammunition.

According to a preferred embodiment of the invention, each tube of the conveyor is a semicylindrical tube open substantially over its entire height, and the device for withdrawing ammunition from the magazine is an automatic device of the tilting type, which comprises a first device for tilting each ammunition via the tube opening and through the magazine outlet opening, and a second device to receive the ammunition outside the magazine.

As an example, the first device is situated inside the chain formed by the set of tubes of the conveyor, and comprises a pivoting finger actuated by a motor apparatus to penetrate partly into a vertical slot extending along each tube; and the second device comprises consist of a cradle inclined substantially at an angle of 45°.

Such a magazine can advantageously be installed in a tank in which the cradle for receiving ammunition at the outlet of the magazine can interact with a delivery block of a system for automatically loading ammunition into the chamber of a gun supported by the turret of a tank, the magazine then being advantageously situated low down and at the rear of the tank.

BRIEF DESCRIPTION OF THE DRAWINGS

Other advantages, characteristics, and details of the invention will emerge from the explanatory description that follows, given with reference to the attached drawings, which are provided solely as examples and in which:

FIG. 2a is a schematic sectional view of the lower part of a tube depicted in FIG. 2;

FIG. 2b is a simplified detail view illustrating a different form of the attachment devices between the conveyor tubes;

DETAILED DESCRIPTION OF PREFERRED EMBODIMENTS

Figure 1:
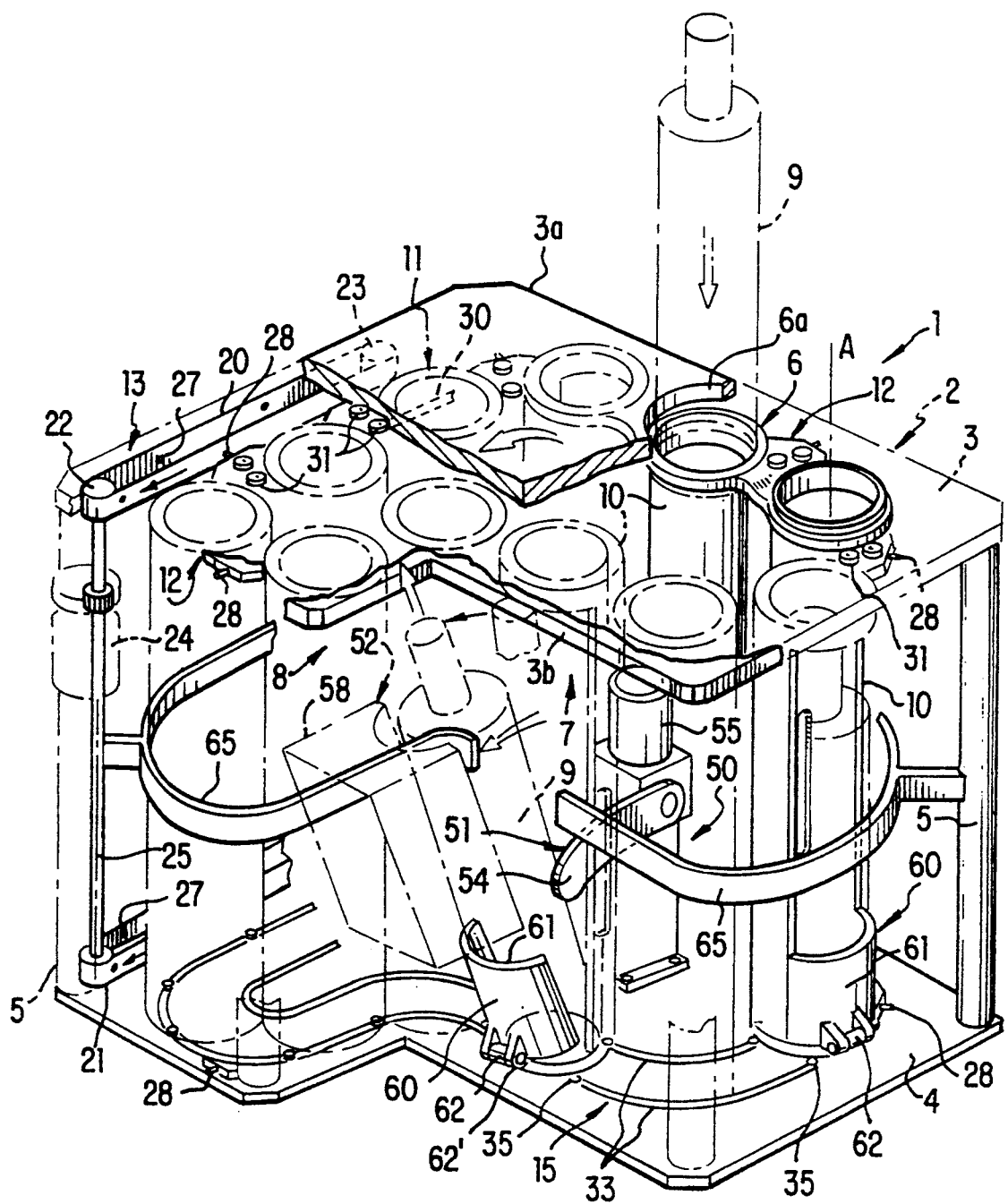
FIG. 1 is a perspective view, with partial cutaways, of an ammunition magazine according to the invention.

Ammunition magazine 1 according to the invention and as depicted in FIG. 1 comprises a frame 2 made up of two superposed horizontal plates, upper 3 and lower 4 respectively. Plates 3 and 4 are rectangular overall, of identical dimensions, and linked to one another by vertical struts 5. An entrance 6 of magazine 1 is defined by an opening 6a provided in upper plate 3 and situated near one of the sides thereof, for example side 3a, while an outlet 7 extends substantially over the entire height of magazine 1 and is situated at one of the lateral open faces of magazine 1, for example the one corresponding to side 3b of upper plate 3 which is opposite its side 3a.

In general, magazine 1 is equipped with a conveyor 8 to deliver ammunition 9, introduced through entrance 6 of magazine 1, to its outlet 7, where they are withdrawn one by one to be loaded into the barrel of a gun (not depicted) in a manual, semiautomatic, or automatic manner.

In the example considered here, conveyor 8 comprises a set of vertical tubes 10 in each of which is accommodated ammunition 9. Tubes 10 are placed side by side to form a closed chain 11. Complementing conveyor 8 are attachment devices 12 between two adjacent tubes 10, and a device 13 for driving chain 11, formed by the set of tubes, inside magazine 1 along a rolling track 15 in the form of a closed loop. These various elements are configured so that as chain 11 moves, tubes 10 pass in line with magazine entrance 6 and opposite its outlet 7.

Figure 2:
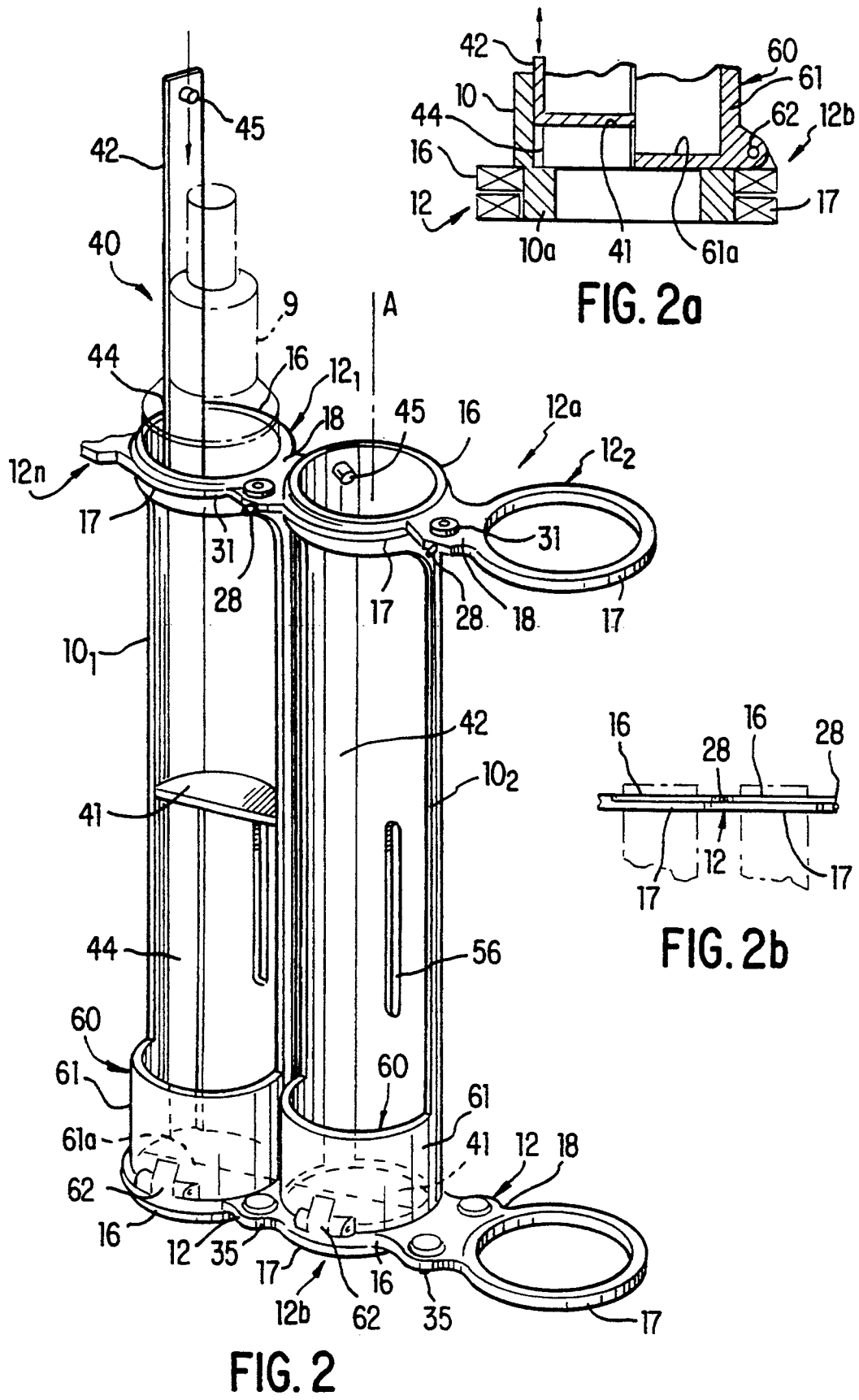
FIG. 2 is a perspective view of two tubes of the conveyor, and of the attachment devices linking them in an articulated manner.

As depicted in FIG. 2, each tube 10 is, according to a preferred embodiment of the invention that will be discussed further below, an open half-tube of semicylindrical cross section.

Each attachment device 12 between two adjacent tubes 10 is designed so that a tube 10 can move in circular displacement with respect to axis A of at least one of the two adjacent tubes. In the example considered here, each attachment device 12 comprises two circular rings 16 and 17 with parallel axes, integral with a support plate 18 and situated respectively on either side thereof. Ring 16 has an inside diameter such that it can be slid with a press fit around each tube 10, while ring 17 has an inside diameter such that it can be mounted with a clearance around each tube 10.

Specifically, ring 16 of a first attachment device $12_1$ is mounted in a fixed manner around a first tube $10_1$, while its ring 17 is mounted with a clearance around a second tube $10_2$ adjacent first tube $10_1$. Ring 16 of a second attachment device $12_2$ is mounted in a fixed manner around second tube $10_2$, while its ring 17 is mounted with a clearance around a third tube $10_3$ (not depicted) adjacent to second tube $10_2$ and so forth, ring 16 (not depicted) of an nth attachment device $12_n$ being mounted around nth tube $10_n$ (not depicted), while its ring 17 is mounted with a clearance around first tube $10_1$.

Thus at least ring 16 of a first attachment device 12 and ring 17 of a second attachment device 12 are mounted around each tube 10 of conveyor 8. In the example considered here, two upper 12a and lower 12b attachment assemblies of attachment devices 12 are provided, situated respectively towards the two ends of tubes 10 to facilitate displacement of chain 11 formed by the set of tubes 10 of conveyor 8.

Figure 4:
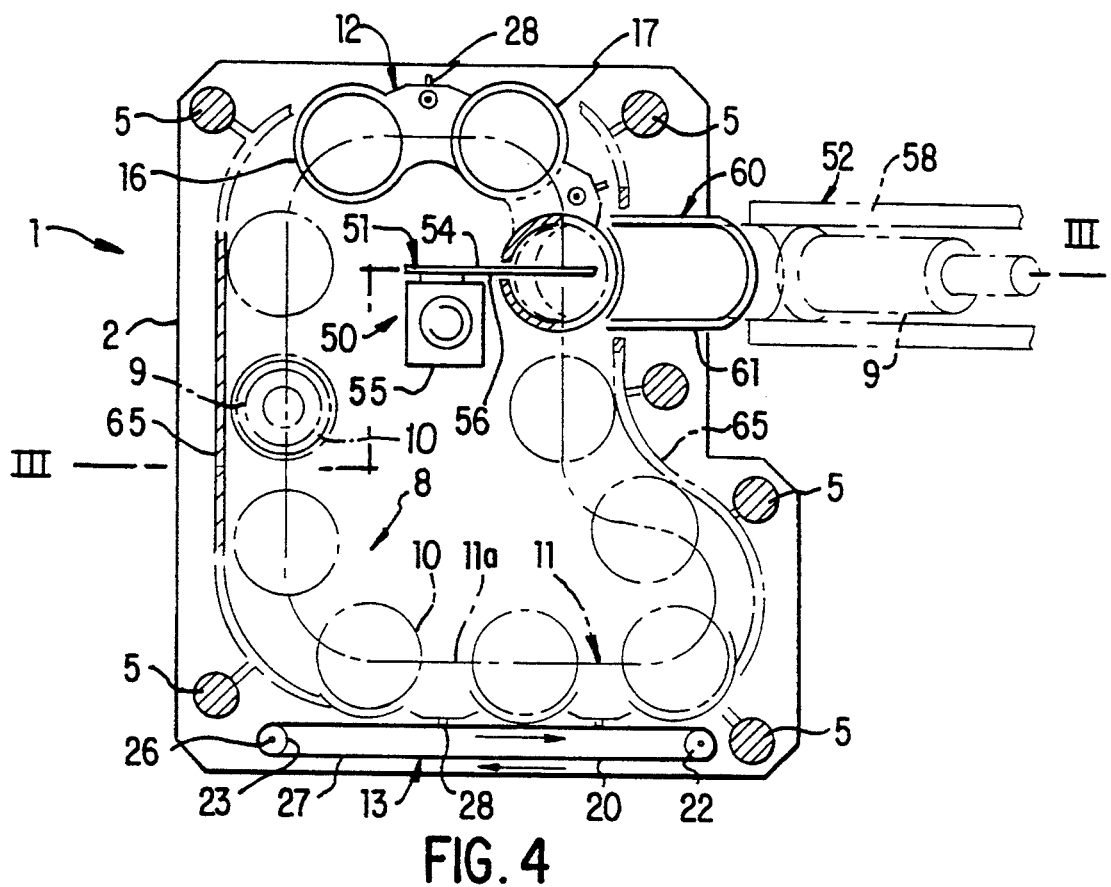
FIG. 4 is a simplified top view of FIG. 1.

Referring to FIGS. 1 and 4, drive device 13 of chain 11 formed by the set of tubes 10 of conveyor 8 comprises two superposed belts 20 and 21, each wound around two rollers 22 and 23, which have vertical axes and are driven by a motor apparatus such as a geared motor 24. More precisely, geared motor 24 drives a vertical shaft 25 on whose two ends are rotatably mounted the two rollers 22, for example, while the two rollers 23 are mounted so as to rotate freely at the two ends of a vertical shaft 26.

Drive device 13 is housed inside magazine 1 and outside closed chain 11 formed by the set of tubes 10. The two belts 20 and 21 are respectively situated in the vicinity of upper 3 and lower 4 plates of the frame of magazine 1, and extend along a rectilinear part 11a of chain 11 of tubes 10 of conveyor 8 (FIG. 4). Chain 11 is positively driven by belts 20 and 21 by means of complementary means such as holes 27 provided along each belt 20 and 21, and lateral pins 28 provided on chain 11, two successive holes 27 and two successive pins 28 being spaced at an identical pitch so that pins 28 engage in holes 27 as belts 20 and 21 advance. Pins 28 are advantageously situated at the upper 12a and lower 12b attachment assemblies, and are carried on plates 18 which support rings 16 and 17.

However, with reference to the upper attachment assembly 12a depicted in FIG. 2, rings 16 and 17 installed around a single tube 10 are mounted one above the other, so that the two plates 18 which respectively support rings 16 and 17 are offset with respect to one another. The result is that pins 28 which extend laterally from each of plates 18 are not aligned. Thus, referring to FIG. 2b, the two rings 16 and 17 of each attachment device 12 are advantageously offset with respect to one another so that pins 28 are aligned, in such a way that they can engage in aligned holes 27 of belts 20 and 21 of drive device 13.

Figure 3:
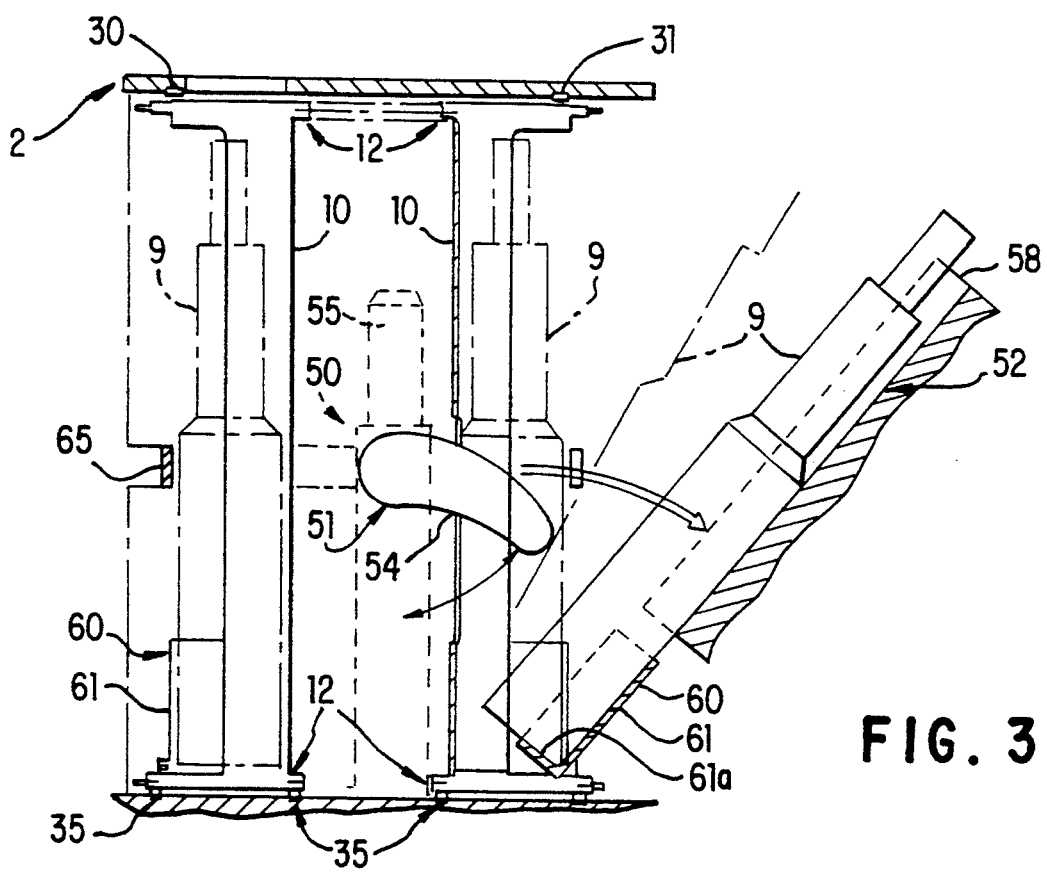
FIG. 3 is a simplified sectional view along line III—III of FIG. 4.

Referring to FIGS. 1 and 3, rolling track 15 of chain 11 formed by the set of tubes 10 of conveyor 8 is defined by guide means respectively provided on the inside faces of upper plate 3 and lower plate 4 of frame 2 of magazine 1. More precisely, on the inside surface of upper plate 3 there is provided an annular channel 30 with a substantially rectangular cross section, designed to receive two rollers 31 with vertical axes supported rotatably by support plate 18 of each attachment device 12 of upper attachment assembly 12a, said two rollers 31 rolling respectively on the two lateral walls of channel 30. Provided on the inside face of lower plate 4 are two concentric annular grooves 33 in which roll respectively two balls 35 supported by support plate 18 of each attachment device 12 of lower attachment assembly 12b.

Referring to FIGS. 2 and 2a, a description will be given of the means used to introduce ammunition 9 into tube 10 of conveyor 8.

According to a preferred embodiment of the invention, an introduction device 40 is associated with each tube 10, i.e., there are as many devices 40 as tubes 10. Referring to FIG. 2, each introduction device 40 comprises a support 41 in the form of a half-disk of radius slightly less than that of a tube 10 and a strut 42 connected at one end to the periphery of support 41. Strut 42 extends perpendicular to support 41 over a height substantially equal to the height of a tube 10. Strut 42 has, in cross section, a shape that curves along a radius of curvature equal to that of tube 10, and it is installed slidingly in a vertical internal groove 44 extending between the upper end of each tube 10 and an internal annular shoulder 10a forming a stop, provided towards the lower end of each tube 10.

Towards its upper end, strut 42 has a radial internal lug 45 which acts as a grasping element for an external device (not depicted) for axially displacing loading device 40 along tube 10.

Magazine 1 is equipped with a device 50 with which ammunition 9 can automatically be withdrawn from magazine 1. According to a preferred embodiment of the invention, withdrawal device 50 is of the tilting type, and comprises a first means 51 for causing tilting of ammunition 9 through outlet 7 of magazine 1, and a second means 52 for receiving ammunition 9 outside magazine 1.

First means 51 for causing tilting of ammunition 9 is situated inside chain 11 formed by the set of tubes 10 and opposite outlet 7 of magazine 1. In the example considered here, means 51 comprises a pivoting finger 54 actuated by a motor apparatus 55. Finger 54 is situated in a vertical plane and can engage partly inside a vertical slot 56 provided along each tube 10.

Second means 52 for receiving ammunition 9 outside magazine 1 consists, in the example considered here, of a cradle 58 inclined substantially at 45°.

Utilization of semi-open tubes 10 makes it possible to tilt ammunition 9. Rings 16 and 17 of the two upper 12a and lower 12b attachment assemblies between two adjacent tubes 10 are situated respectively on either side of ammunition 9 so as not to interfere with tilting thereof. In other words, the height of tubes 10 is greater than that of ammunition 9.

However, to allow ammunition 9 to tilt in response to pivoting finger 54, a tilting flap 60 is associated with each tube 10. In the example considered here, and as is evident in FIGS. 1 and 2, each tilting flap 60 consists of a semicylindrical tubular element 61 of the same radius as tubes 10 and closed at one end, or the lower end, by a bottom wall 61a in the form of a half-disk.

Each flap 60 is situated towards the lower end of the associated tube 10 opposite the tube opening, and it is installed so as to tilt about a horizontal axis by means of a hinge 62 fastened to ring 16 of attachment device 12 of lower attachment assembly 12a associated with tube 10. Hinge 62 comprises a return spring (62') which continuously presses flap 60 against tube 10, so that between them they define a cylindrical housing which surrounds the lower part of ammunition 9. The half-disk formed by bottom wall 61a of flap 60, when the latter is in the vertical position, comes to the same level as the half-disk formed by support 41 of introduction device 40 associated with tube 10, thus defining between them a two-part circular bottom wall on which ammunition 9 rests, each of the two parts 41 and 61a of the bottom wall resting on shoulder 10a situated at the lower part of tube 10 (FIG. 2a).

Thus, as ammunition 9 tilts in response to finger 54, it causes tilting of flap 60. Bottom wall 61a supports ammunition 9 so that it is not displaced with respect to flap 60.

Also provided inside magazine 1 is at least one guide rail 65, which is fastened to struts 5 of frame 2 and follows roller track 15 to prevent ammunition 9 from themselves causing flaps 60 to tilt. Guide rail 65 is situated substantially halfway up the height of tubes 10. Obviously rail 65 is interrupted at outlet 7 of magazine 1 to allow ammunition 9 to pass as it tilts toward outlet 7 of magazine 1.

A description will now be given of the procedure by which ammunition is introduced into and withdrawn from magazine 1, referring to the preferred embodiment of the invention and assuming that conveyor 8 is empty and at a standstill, with a tube 10 situated in line with the opening of entrance 6 of magazine 1.

The procedure by which ammunition 9 is introduced into tube 10 consists in:

Pulling strut 42 of introduction device 40 associated with tube 10 through the opening of entrance 6 of the magazine by means of a grasping apparatus (not depicted) which grasps radial lug 45 of strut 42 so as to bring support plate 41 to the vicinity of entrance 6;

Positioning ammunition 9 vertically on support plate 41;

Lowering introduction device 40 back into tube 10 until support plate 41 comes to rest on shoulder 10a of tube 10; and Actuating geared motor 24 of drive device 13 of chain 11 formed by tubes 10 of conveyor 8 to bring another tube 10 in line with entrance opening 6a of the magazine to allow introduction of another ammunition 9, and so forth until the magazine is filled.

Note that this procedure makes it possible, if need be, to remove ammunition 9 from magazine 1 through entrance opening 6a by pulling strut 42 of introduction device 40 associated with tube 10 in which ammunition 9 is housed.

In the event that such a magazine 1 is situated inside a tank, low down and at the rear thereof, entrance opening 6a is provided in the tank's chassis, and its turret is oriented, if necessary, so as to uncover entrance opening 6a to allow the procedure for filling magazine 1.

Assuming that ammunition 9 has been fired by the tank's gun, new ammunition 9 must be loaded into the gun chamber, and hence must be withdrawn from magazine 1.

The procedure for withdrawing the ammunition consists in:

Operating geared motor 24 of drive device 13 of conveyor 8, if necessary, to bring a tube 10 containing ammunition 9 opposite outlet 7 of magazine 1;

Actuating motor apparatus 55 of withdrawal device 50 to cause finger 54 to pivot; finger 54, penetrating into tube 10 through slot 56 thereof, comes in contact with ammunition 9 and causes it and associated flap 60 to tilt (assuming that the tank is on substantially level ground), ammunition 9 being received directly on cradle 58 situated outside magazine 1;

Removing ammunition 9 from the cradle and then manually loading it into the gun chamber, or actuating an automatic loading device; and Operating drive device 13 of conveyor 8 to position tube 10 of another ammunition 9 opposite outlet 7 of magazine 1.

In the example considered here, magazine 1 is open on each of its lateral faces. In general, the frame of magazine 1 depends on the equipment it is designed to supply, so that the frame will most often consist of a part of the chassis of the associated piece of equipment. However, the magazine can have its own frame and constitute an integral assembly.

As a variant of the embodiments described above, it would be possible to eliminate device 40 for introducing ammunition 9 that is associated with each tube 10, and to provide only a single introduction device outside the magazine.

Of course the invention is not limited to means such as those described above, and includes technical equivalents within the capacity of one skilled in the art, especially with regard to the drive device for the chain of tubes of the conveyor, and the device for withdrawing ammunition from the magazine.

What is claimed is:

1. An ammunition magazine comprising a conveyor providing vertical storage of the ammunition so as to bring the ammunition automatically to an outlet of the magazine, and a device for withdrawing each ammunition from the magazine; the conveyor comprising a plurality of vertical tubes placed side by side to form a closed chain, a plurality of attachment devices, each of said attachment devices linking two adjacent tubes such that one of the two adjacent tubes is pivotable only about a central axis of the other of the two adjacent tubes and comprising two circular rings with parallel axes, said rings being integral with support plate and disposed respectively on either side thereof, wherein one of the rings is fixedly mounted around one of the two adjacent tubes, while the other ring is mounted with a clearance around the other of the adjacent tubes, and a device for driving the chain inside the magazine along a closed-loop rolling track.

2. An ammunition magazine according to claim 1, wherein at least the two rings of two of said attachment devices are mounted on each of said tubes forming an attachment assembly.

3. An ammunition magazine according to claim 2, wherein an upper and a lower attachment assembly of attachment devices are respectively disposed towards opposing ends of each of said tubes.

4. An ammunition magazine according to claim 3, further comprising a frame having an upper plate and a lower plate, said frame housing said chain and said driving device, said rolling track comprising an annular channel in said upper plate, wherein said upper attachment assembly comprises at least one roller rotatably disposed in said annular channel, said rolling track further comprising two annular grooves in said lower plate, wherein said lower attachment assembly comprises two rotatable balls rollable respectively in said grooves.

5. An ammunition magazine according to claim 1, wherein each of said tubes of the conveyor is open having a semicylindrical cross section and extending over a height greater than that of said ammunition.

6. An ammunition magazine comprising a conveyor providing vertical storage of the ammunition so as to bring the ammunition automatically to an outlet of the magazine, and a device for withdrawing each ammunition from the magazine; the conveyor comprising a plurality of vertical tubes placed side by side to form a closed chain, a plurality of attachment devices, each of said attachment devices linking two adjacent tubes such that one of the two adjacent tubes is pivotable only about a central axis of the other of the two adjacent tubes, and a device for driving the chain inside the magazine along a closed-loop rolling track, wherein each tube further comprises a flap pivotally attached to a lower end of said tube, said flap being continuously urged by a return spring against the tube so as to define therewith a housing which surrounds the ammunition.

7. An ammunition magazine according to claim 6, wherein said flap is made up of a tubular semicylindrical element having the same radius as said tube and closed at one end by a bottom wall in the form of a half-disk, said flap being pivotable about a hinge supported by a corresponding attachment device of the tube.

8. An ammunition magazine comprising a conveyor providing vertical storage of the ammunition so as to bring the ammunition automatically to an outlet of the magazine, and a device for withdrawing each ammunition from the magazine; the conveyor comprising a plurality of vertical tubes placed side by side to form a closed chain, a plurality of attachment devices, each of said attachment devices linking two adjacent tubes such that one of the two adjacent tubes is pivotable only about a central axis of the other of the two adjacent tubes, and a device for driving the chain inside the magazine along a closed-loop rolling track, the ammunition magazine further comprising a device for introducing ammunition into said tubes, one introduction device being associated with each of said tubes.

9. An ammunition magazine according to claim 8, wherein each introduction device comprises a support extended attached to a strut, each of said tubes having an internal vertical groove, said strut being arranged to slide along said internal vertical groove, ammunition resting on said support, said support restable on an internal shoulder provided in a lower end of each of said tubes.

10. An ammunition magazine according to claim 9, wherein said support of each introduction device is a half-disk which is disposed level to the half-disk formed by said bottom wall (61a) of said flap to form a two-part circular bottom wall, the ammunition being supported by said two-part circular bottom wall.

11. An ammunition magazine according to claim 8, wherein said device for driving said closed chain formed by said tubes comprises at least one belt wound around two rollers with vertical axes, one of said rollers being rotated by a motor, said driving device further comprising a complementary means disposed on said belt and on said chain, said complementary means interacting to drive said chain.

12. An ammunition magazine according to claim 11, wherein said belt is disposed outside said chain and extends parallel to a rectilinear part of said chain.

13. An ammunition magazine according to claim 11, wherein the complementary means comprises holes provided along said belt and lateral pins supported by said attachment devices, said holes and said pins being spaced at a substantially identical pitch so that the pins penetrate into the holes.

14. An ammunition magazine comprising a conveyor providing vertical storage of the ammunition so as to bring the ammunition automatically to an outlet of the magazine, and a device for withdrawing each ammunition from the magazine; the conveyor comprising a plurality of vertical tubes placed side by side to form a closed chain, a plurality of attachment devices, each of said attachment devices linking two adjacent tubes such that one of the two adjacent tubes is pivotable only about a central axis of the other of the two adjacent tubes, and a device for driving the chain inside the magazine along a closed-loop rolling track, wherein said withdrawal device comprises a first means for causing the ammunition to tilt through said outlet of said magazine, and a second means for receiving the ammunition outside of said magazine.

15. An ammunition magazine according to claim 14, wherein the first means comprises a pivoting finger disposed in a vertical plane and actuated by a motor, and a vertical slot provided along each of said tubes, said finger pivotable through said slot by said motor.

16. An ammunition magazine according to claim 15, wherein the second means is a cradle inclined substantially at 45°.

17. An ammunition magazine, comprising:
a plurality of tubes;
a plurality of attachment devices, each of said attachment devices linking two adjacent tubes such that one of the two adjacent tubes is pivotable only about a central axis of the other of the two adjacent tubes, said plurality of tubes forming a closed chain;
an introducing means for introducing ammunition into each of said tubes, wherein each of said tubes comprises an internal groove, said introducing means comprising a strut slidable in said groove, wherein said strut includes a support means at one end for supporting said ammunition and means at an opposing end for facilitating entry of said strut into said tubes;
a driving means for driving said closed chain of tubes; and
a withdrawal means for withdrawing said ammunition from said tubes, wherein said driving means drives said closed chain of tubes and said ammunition from said introducing means to said withdrawal means.

18. An ammunition magazine according to claim 17, wherein said support means is a first semi-circular plate.

19. An ammunition magazine according to claim 17, wherein said driving means comprises at least one belt member wound around two rollers, one of said rollers being driven by a motor, wherein said belt is in communication with said chain of tubes.

20. An ammunition magazine according to claim 19, wherein said belt member has a plurality of holes, said holes engageable with pins on said attachment devices.

21. An ammunition magazine according to claim 20, further comprising a frame having a first plate and a second plate, said frame housing said chain of tubes and said driving means, said driving means further comprising a rolling track having an annular channel in said first plate, wherein a first respective one of said attachment devices comprises at least one roller rotatably disposed in said annular channel, said rolling track further having two annular grooves in said second plate, wherein a second respective one of said attachment devices comprises two rotatable balls rollable respectively in said grooves.

22. An ammunition magazine according to claim 17, wherein each of said tubes comprises a cut-out portion such that there is an opening in a portion thereof, said withdrawal means comprising a first means for causing said ammunition to tilt through said opening and a second means for receiving the ammunition.

23. An ammunition magazine according to claim 22, wherein said tubes have a slot in a portion opposite said opening, said first means comprising a pivoting finger actuated by a motor, said finger arranged to be pivoted through said slot.

24. An ammunition magazine according to claim 23, wherein said second means is a cradle shaped to receive said ammunition.

25. An ammunition magazine according to claim 22, wherein each of said tubes further comprises a flap pivotally attached to one end of said tube, said flap being urged against the tube by a spring, wherein said flap is shaped to selectively enclose a portion of said opening.

26. An ammunition magazine according to claim 25, wherein said flap is a tubular semicylindrical member having a radius essentially the same as the radius of said tube, wherein said flap is pivotable about a hinge attached to a corresponding attachment device of the tube.

27. An ammunition magazine according to claim 18, wherein each of said tubes comprises a cut-out portion such that there is an opening in a portion thereof, said withdrawal means comprising a first means for causing said ammunition to tilt through said opening and a second means for receiving the ammunition.

28. An ammunition magazine according to claim 27, wherein each of said tubes further comprises a flap pivotally attached to one end of said tube, said flap being urged against the tube by a spring, wherein said flap is shaped to selectively enclose a portion of said opening.

29. An ammunition magazine according to claim 28, wherein said flap is a tubular semicylindrical member having a radius essentially the same as the radius of said tube, wherein said flap is pivotable about a hinge attached to a corresponding attachment device of the tube.

30. An ammunition magazine according to claim 29, further comprising a second semi-circular plate attached to said flap and perpendicular thereto, said second semi-circular plate and said first semi-circular plate forming a two-part circular end wall of said tube, the ammunition being supported by said two-part circular end wall.

31. An ammunition magazine, comprising:
a plurality of tubes, each of said tubes comprising a cut-out portion such that there is an opening in a portion thereof;
a plurality of attachment devices, each of said attachment devices linking two adjacent tubes, said plurality of tubes forming a closed chain;
an introducing means for introducing ammunition into each of said tubes;
a driving means for driving said closed chain of tubes; and
a withdrawal means for withdrawing said ammunition from said tubes, wherein said driving means drives said closed chain of tubes and said ammunition from said introducing means to said withdrawal means, said withdrawal means comprising a first means for causing said ammunition to tilt through said opening and a second means for receiving the ammunition.

* * * * *